US00RE35603E

United States Patent [19]

Lassiter

[11] E Patent Number: Re. 35,603

[45] Reissued Date of Patent: Sep. 16, 1997

[54] ROOFING MATERIAL WITH NAIL TABS

[76] Inventor: Robert F. Lassiter, 503 S. Barton La., Levelland, Tex. 79336

[21] Appl. No.: 544,858

[22] Filed: Oct. 18, 1995

Related U.S. Patent Documents

Reissue of:

[64] Patent No.: 5,365,709
Issued: Nov. 22, 1994
Appl. No.: 133,989
Filed: Oct. 12, 1993

[51] Int. Cl.[6] ..... E04B 5/00

[52] U.S. Cl. ..... 52/408; 156/92

[58] Field of Search ..... 52/408, 410, 411, 52/413; 156/92; 428/131, 280

[56] References Cited

U.S. PATENT DOCUMENTS

| | | |
|---|---|---|
| 3,779,373 | 12/1973 | Maier . |
| 3,841,474 | 10/1974 | Maier . |
| 3,904,032 | 9/1975 | Maier . |
| 4,033,499 | 7/1977 | Butler . |
| 4,624,721 | 11/1986 | Sadler et al. . |
| 4,627,207 | 12/1986 | Young et al. . |
| 4,641,472 | 2/1987 | Young et al. . |
| 4,788,807 | 12/1988 | Whitman . |
| 5,407,313 | 4/1995 | Bruins et al. . |
| 5,415,511 | 5/1995 | Damron . |

*Primary Examiner*—Creighton Smith
*Attorney, Agent, or Firm*—Vaden, Eickenroht & Thompson, L.L.P.

[57] ABSTRACT

The invention is to a roofing material and the method of making the roofing material. The roofing material is in the form of a standard material know as "felt" or "tarpaper" that has a plurality of nail tabs attached to the felt base material prior to coating the felt base with a water resistant material such as petroleum "tar". In a second embodiment, the nail tabs are attached to the felt during installation of the felt on a roof. The roofing material is attached to a roof with roofing nails that are driven through the tabs.

27 Claims, 4 Drawing Sheets

ROOFING MATERIAL WITH NAIL TABS

Matter enclosed in heavy brackets [ ] appears in the original patent but forms no part of this reissue specification; matter printed in italics indicates the additions made by reissue.

FIELD OF THE INVENTION

This invention relates generally to roofing materials of the type used in the drying-in process on roofs, and more particularly, roofing materials such as felt-type tar paper and fiber glass-type roofing paper with reinforcement tabs applied to the roofing paper for use under fasteners used when applying or installing these types of roofing products.

BACKGROUND OF THE INVENTION

In the application of roofing materials to roofs, a liner commonly called "tar-paper" or "felt" is applied to the roof prior to the application of the shingles. The "tar-paper" materials are made from paper products and coated with a petroleum "tar" to increase the strength of the paper products, and to render the material water proof. The base material, while commonly a paper product, may be cloth, fiber glass or any other covering material that is waterproof. The tar-paper is secured to the roof by roofing tacks that have enlarged heads. In addition to the roofing nail, tin and plastic caps in the form of thin disks are used to increase the area under the heads of the nails to increase the area of pressure applied to the secured point of the tar paper to prevent tearing of the tar-paper at the secured points.; Such tabs are disclosed in U.S. Pat No. 4,624,721, which shows the use of plastic tabs in a continuous strip, the tabs being held in place with a nail or staple used in securing the roofing material to a roof.

SUMMARY OF THE INVENTION

The present invention relates generally to roofing materials, such as felt-type tar paper and fiberglass-type roofing paper, and more particularly to an improved fastener nail cap pad that is incorporated into the felt. The incorporation of the nail cap pads onto the felt type tar paper or fiberglass roofing-type paper, increases the ease and safety, while at the same time reduces the amount of labor and time during installation. The nail cap pads are fabricated and applied directly onto the felt tar paper roofing paper in rows and at spaced intervals along the felt An alternate embodiment applies continuous reinforcement strips along the length of the felt. The tabs or continuous strips of reinforced areas improve safety, ease and time, during installation of these products. Until now the roofer had to hold the felt or fiberglass in place with one hand, reach and get a metal tin cap and a nail with the other hand, then while still holding the material in place must place the metal tin cap and either drive a nail through it or staple it with an air hammer. This is both difficult and dangerous on steep roofs. It is also known that the present metal tin caps, have sharp edges and often times barbs on them that cause cuts and injuries to the roofers and consumer, at the same time causing rips and tears to the felt and fiberglass-type roofing paper. The present invention, by its design, fabrication and manufacture either completely eliminates or greatly reduces all these problems.

It is, therefore, the principal object of the present invention to provide an improved method for fabricating and manufacturing of nail cap pads directly onto the roofing paper, thereby eliminating the various types of fasteners such as, metal tin caps, metal nail caps, plastic nail caps, and other device that cause rips and tears, due to the sharp edges and barbs found on these existing type fasteners.

A related object of the present invention, is to provide an improved method for fabricating and manufacturing of nail cap pads directly onto the felt tar paper or fiberglass-type roofing paper, thereby eliminating the various types of fasteners such as, metal tin caps, metal nail caps, and plastic nail caps which cause injuries to roofers and consumers, due to the sharp edges and barbs found on these existing types of fasteners.

Yet another object of the present invention is to provide a new and unique type nail cap pad, which is fabricated and manufactured directly onto the felt tar paper or fiberglass-type roofing paper, thereby reducing the labor and time required during installation of these products.

A still further object of the present invention, is to provide a new improved method for fabricating and manufacturing of nail cap pads directly onto the felt tar paper or fiberglass-type roofing paper, thereby making it easier and safer to install, particularly on steep roofs.

The technical advance represented by the invention as well as the objects thereof will become apparent from the following description of a preferred embodiment of the invention when considered in conjunction with the accompanying drawings, and the novel features set forth in the appended claims.

DETAILED DESCRIPTION OF THE PREFERRED EMBODIMENT

In the description which follows, the drawings are not necessarily to scale, and in some instances proportions have been exaggerated in order to more clearly depict certain features of the invention.

Figure 1:
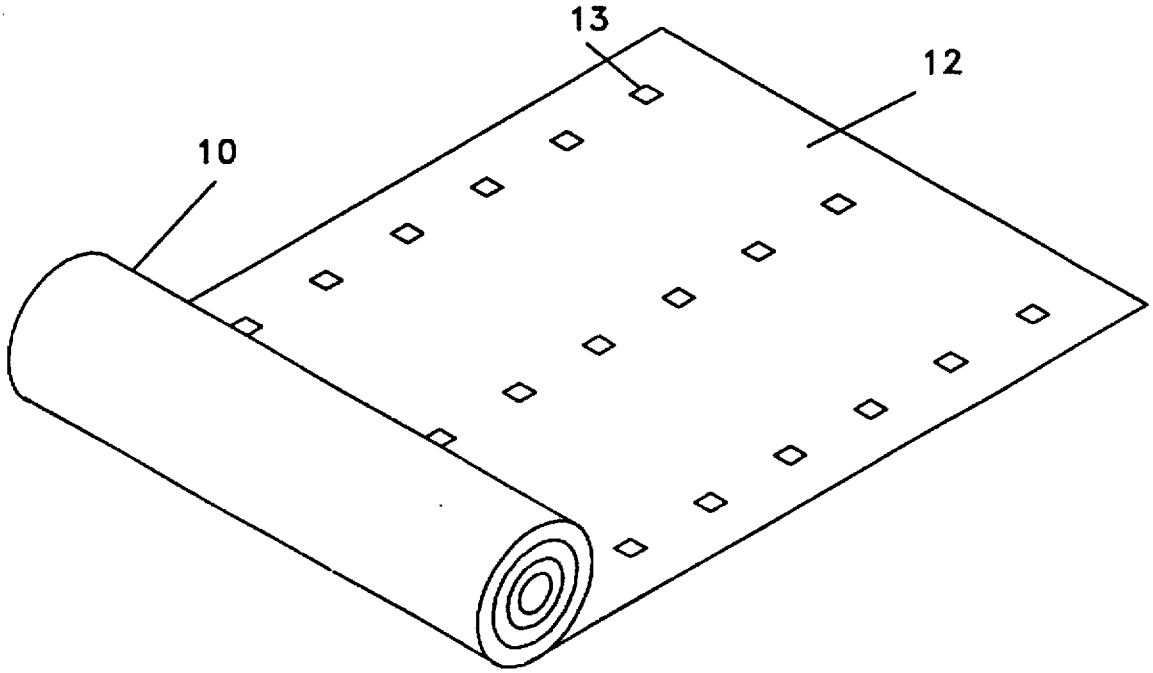
FIG. 1 illustrates a roll of roofing material with reinforcement tabs.

FIG. 1 illustrates a roll of roofing material 10 of felt tar paper or fiberglass-type roofing paper used in the roofing process. Roofing material 10 has at least one row of nail cap pads 13 on the surface 12. Nail cap pads 13 are, for example, fabricated from a strong fire retardant flexible mesh or webbed type material and attached to surface 12 by industrial adhesive onto the roofing paper. The tabs are placed in rows along the length of the roofing paper and spaced to maximize the holding strength of the roofing paper when the paper is applied to a roof. Nail cap tabs 11 may also be fabricated as individual units, one side having an industrial type adhesive applied, and sealed by means of a pull off and disposable seal such as plastic, wax treated paper to protect the adhesive until the tab is ready for use.

Figure 2:
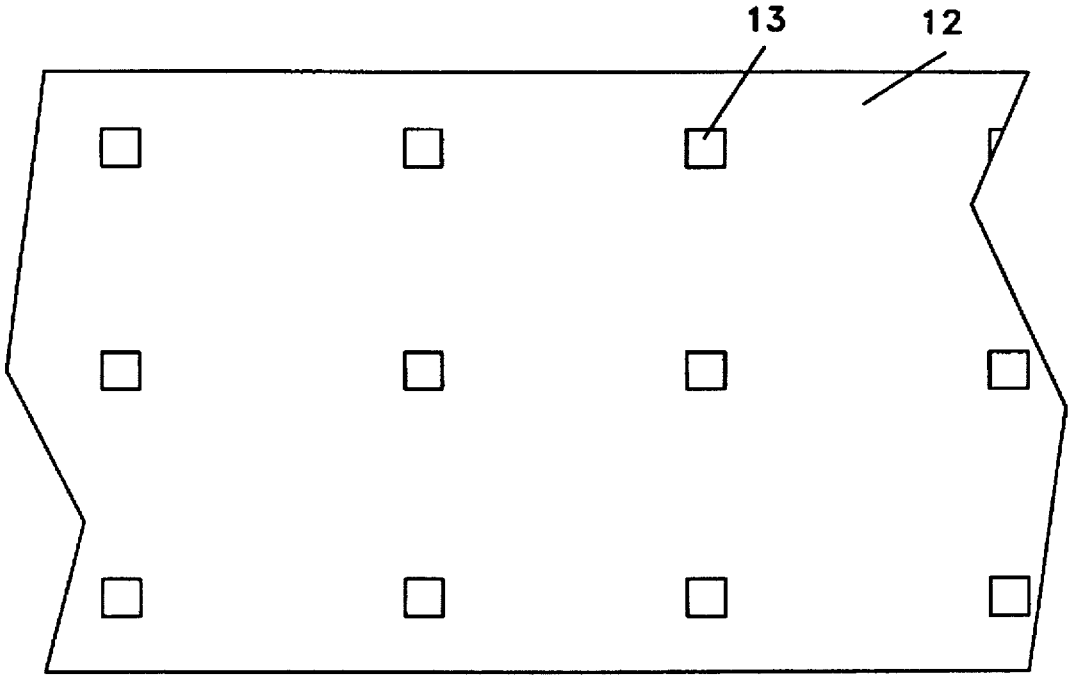
FIG. 2 is a top view of the roofing material of FIG. 1.

FIG. 2 is a top view of roofing paper 12 showing three rows of [taps] *tabs* 13 extending the length of the roofing material. While only three rows are shown, more or less rows may be used depending upon the width of the roofing material, and how secure the roofing material is to be to the roof prior to applying roofing shingles over the roofing material. Where a large area is to be covered, and several days may elapse before the roofing shingles are applied, a larger number of tabs may be desirable to ensure that wind or workers walking on the applied roofing material will not tear or other wise cause the roofing material to be pulled loose.

Figure 3:
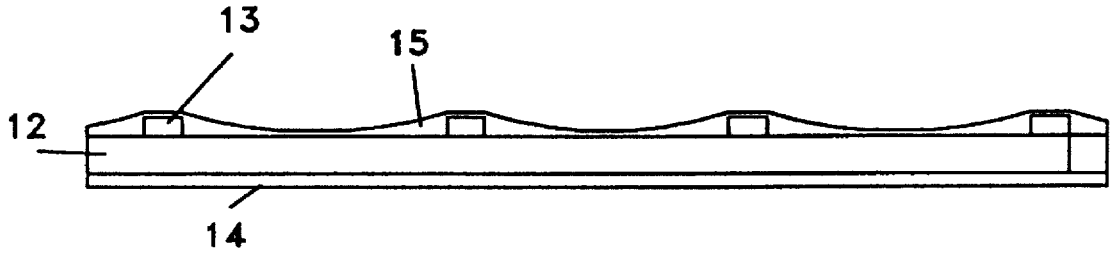
FIG. 3 is a side view of the roofing material of FIG. 1.

FIG. 3 is a side view of the roofing material showing the rolled out surface 12 and tabs 13. In the manufacturing process, the tabs 13 are secured to surface 12 by an adhesive. Thereafter a coating of tar or other waterproofing material is applied over the surface of roofing material 12 and tabs 13. Coating 15 is shown over the tabs and the surface of material 12 to which tabs 13 are applied. Coating 14 covers the surface of material 12 opposite the surface to which tabs 13 are applied. The addition of coatings 14 and 15 renders the roofing material waterproof, and also coating 15 helps hold, in addition to the adhesive, tabs 13 in place prior to nailing through tabs 13 to secure roofing material 12 in place.

Figure 3A:
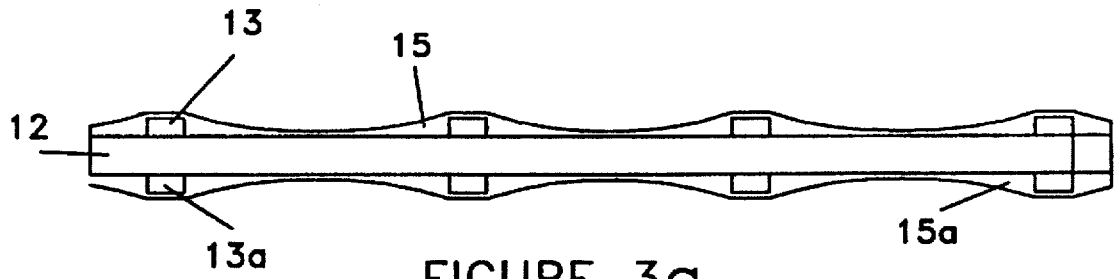
FIG. 3a is a side view of the roofing material of FIG. 1 with nail cap pads on both sides.

FIG. 3a is a side view of the roofing material showing the rolled out surface 12 with tabs 13 on one side and tabs 13a on the other opposite side. By placing the tabs on both sides, the second tab adds additional strength to hold the roofing material in place. The backside of roofing 12 and tabs 13a are covered with coating 14a.

Figure 4:
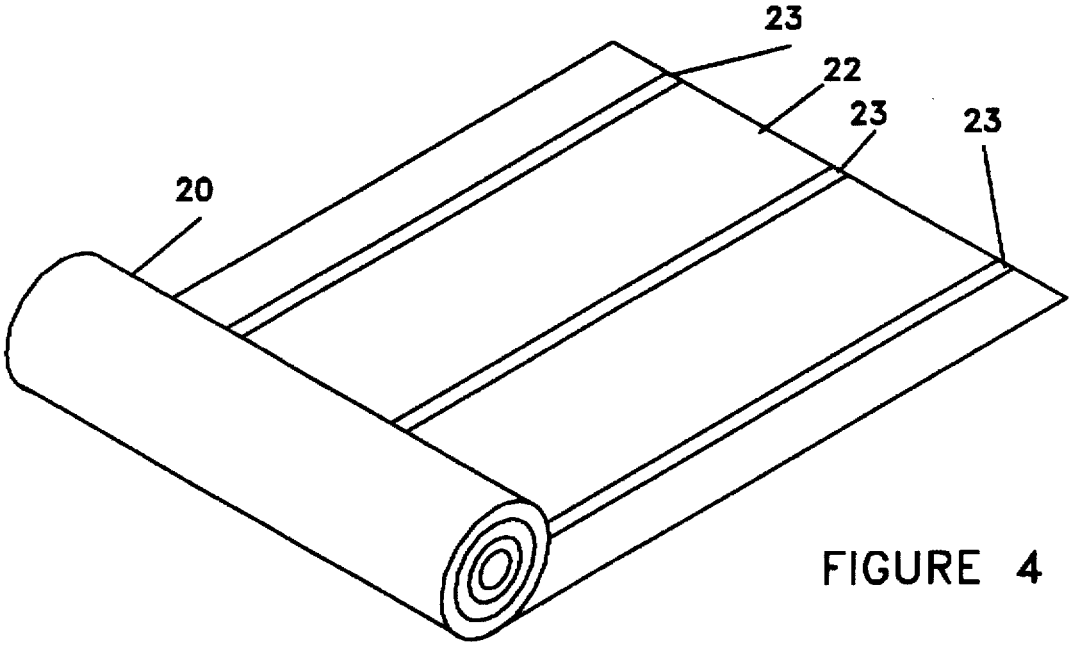
FIG. 4 illustrates a roll of roofing material with strips of reinforcement material.

FIG. 4 illustrates a second embodiment of the invention. Roll 20 of roofing material has at least one strip 23 of reenforcing material extend the length of the roofing material 22. As illustrated, three strips of material 23 extend the length of the roofing material 22. The number of strips used may depend upon the width of the roofing material and the time it is to be on the roof prior to applying roofing shingles over the roofing material. Strips 23 may also be placed on the opposite side of roofing material 22 as are the nail tabs 13a in FIG. 3a.

Figure 5:
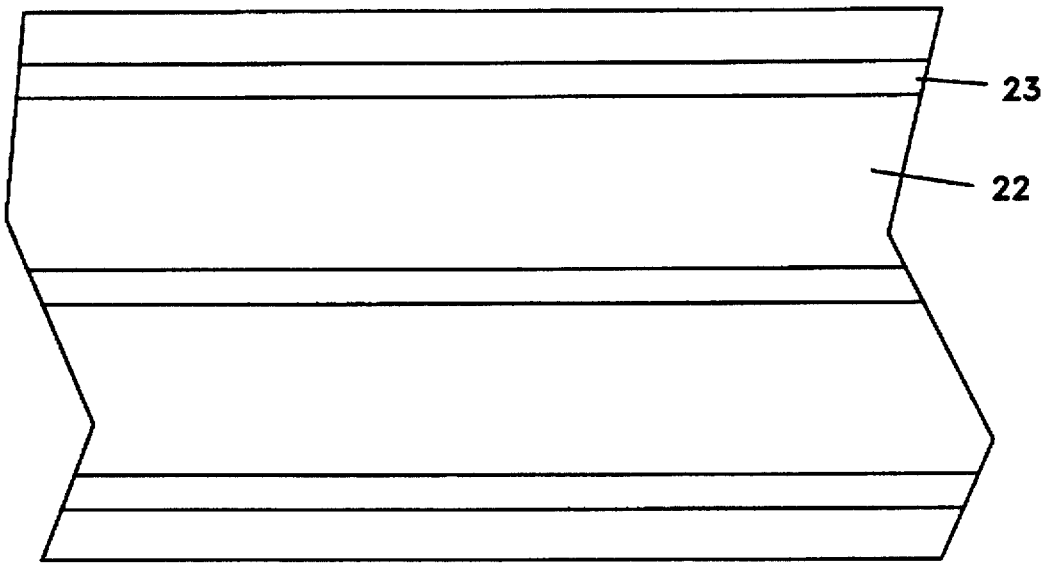
FIG. 5 is a top view of the roofing material of FIG. 4.

FIG. 5 is a side view of the rolled out portion of the embodiment illustrated in FIG. 4 showing the roofing material 22 having three strips of reinforcement material applied to the surface of roofing material 22.

Figure 6:
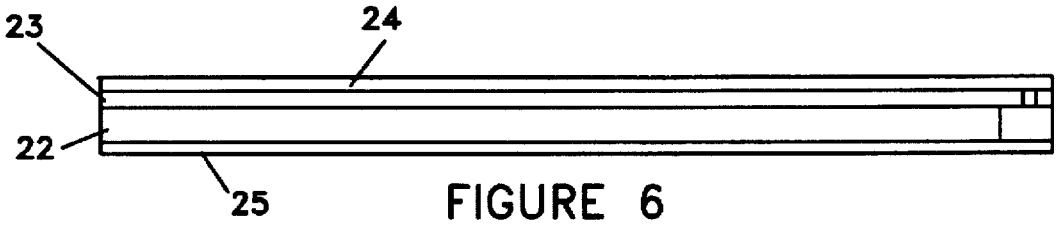
FIG. 6 is a side view of the roofing material of FIG. 4.

FIG. 6 is a side view of the roofing material 22 of FIG. 5 showing the coatings 24 and 25 over the surfaces of the roofing material. Strips 23 are applied with an adhesive, and then the coating 24 seals the top surface of the roofing material, the reenforcing strips 23, and helps hold the strips in place until nails are applied through the strips and roofing material holding the roofing material in place on a roof.

Figure 7:
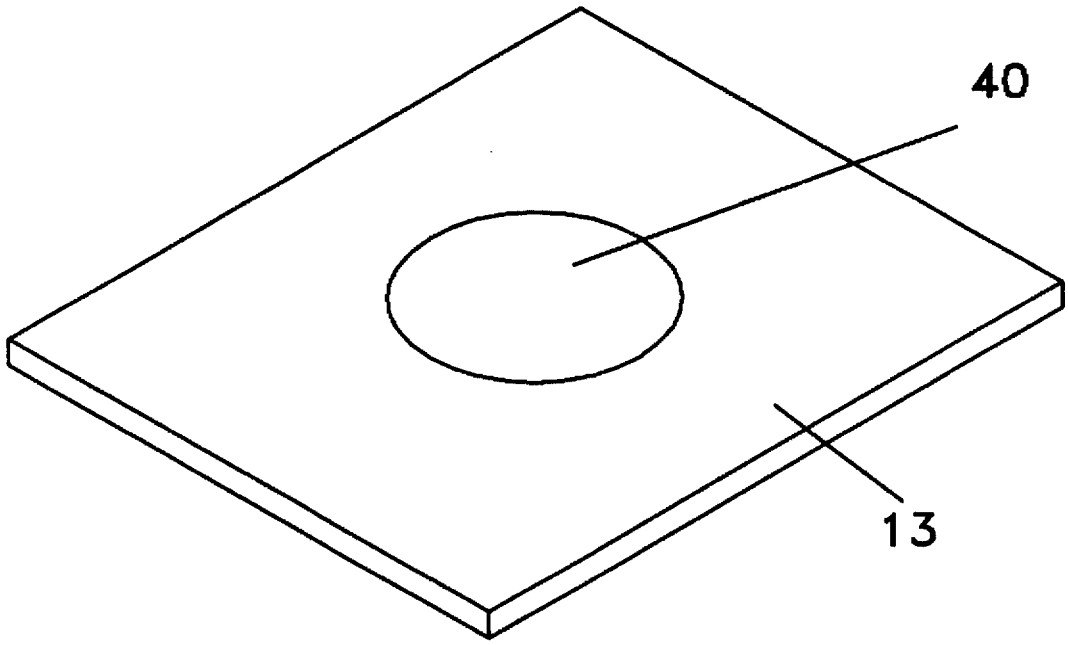
FIG. 7 illustrates a square reinforcement tab.

FIG. 7 shows a square reinforcement tap with a roofing nail 40. The head of nail 40 is smaller that the tab, but the strength of the tab prevents the roofing material from being torn away from the roof at the point of nailing.

Figure 8:
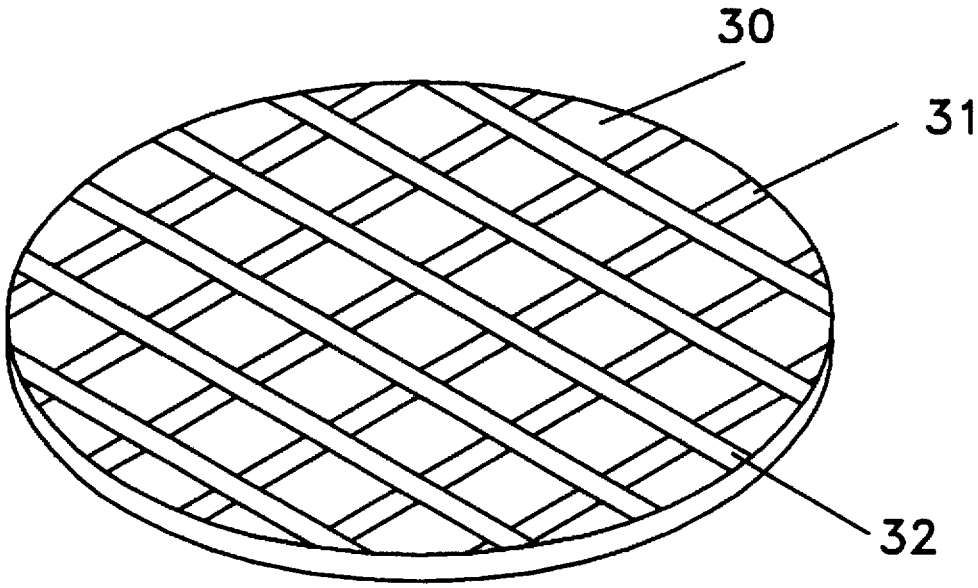
FIG. 8 illustrates a round reinforcement tab.

FIG. 8 shows a round tab 30 with crossed reenforcing strips 31 and 32 through the tab. Such reinforcement strips may also be formed in square tab 13 of FIG. 40. The strips may all run parallel to each other or be applied in two directions as are strips 31 and 32 in FIG. 8.

The reinforcement tabs may have other geometric shapes since the actual shape is not critical to the invention. The material from which the reinforcement tab, or strips, are made may be, for example, cloth, plastic, fiberglass, screen wire, or any other material that has a strength greater that of the roofing material. One example of the material may be a cloth and polyester mixture with cotton or synthetic threads sewn or embedded in the material.

A preferred embodiment of the invention has now been described in detail. Since changes and modifications may be made without departing from the spirit of the invention, the scope of the invention is not to be limited to the foregoing details, except as set forth in the appended claims.

What is claimed is:

1. A roofing material of the type generally applied to roofs prior to the application of roofing shingles[;] comprising:

a water resistant roofing material having two surfaces; and a plurality of nail tabs, having a water resistant coat over the nail tabs, secured, during manufacture, at spaced intervals, along the length of said water resistant roofing material, with an adhesive.

2. The roofing material according to claim 1, wherein said nail tabs are of a fire retardant material.

3. The roofing material according to claim 1, wherein said nail tab is in the form of at least one continuous strip extending along the length of said water resistant roofing material.

4. The roofing material according to claim 1, wherein said nail tab material is selected from one of cloth, plastic, fiberglass, polyester, and mixtures of these materials.

5. The roofing material according to claim 2, wherein said nail tabs have reenforcing threads in the tab extending in at least one direction.

6. The roofing material according to claim 1, wherein nail [taps] *tabs* are placed *on* both of the two surfaces.

7. The roofing material according to claim 1, wherein said nail tabs are applied to said roofing material during manufacturing of the roofing material.

8. The roofing material according to claim 1, wherein said nail tabs are applied to said roofing material as the roofing material is installed on a roof.

9. The roofing material according to claim 8, wherein said tabs are in strips of a plurality of tabs, each tab having an adhesive material on one side and attached to a protective strip of material from which the tab is removed prior to use.

10. A roofing material of the type generally applied to roofs prior to the application of roofing shingles[;] comprising:

a roofing material having a water resistant coating thereon; and a plurality of nail tabs secured with an adhesive at spaced intervals, along the length of said roofing material, said nail tabs covered with the water resistant coating on the roofing material.

11. The roofing material according to claim 9, wherein said nail tabs are of a fire retardant material.

12. The roofing material according to claim 10, wherein said nail tabs is in the form of at least one continuous strip extending along the length of said water resistant roofing material.

13. The roofing material according to claim 10, wherein said nail tab material is selected from one of cloth, plastic, fiberglass, polyester, and mixtures of these materials.

14. The roofing material according to claim 10, wherein said nail tabs have reenforcing threads in the tab extending in at least one direction.

15. The roofing material according to claim 10, wherein said nail tabs are applied to said roofing material during manufacturing of the roofing material.

16. The roofing material according to claim 10, wherein said nail tabs are applied to said roofing material as the roofing material is installed on a roof.

17. The roofing material according to claim 16, wherein said tabs are in strips of a plurality of tabs, each tab has an adhesive material on one side and attached to a protective strip of material from which the tab is removed prior to use.

18. A method of making a roofing material, comprising the steps of:

manufacturing a roofing material in extended lengths;

attaching, with an adhesive, at least one row of nail tabs on at least one side of the roofing material along the extended length of the roofing material; and coating the roofing material and nail tabs with a water resistant material.

19. The method according to claim 18, wherein said nail tab is a continuous strip of material extending the length of the roofing material.

20. The method according to claim 18, wherein said nail tabs are of a different and stronger material than the roofing material.

*21. A roofing material of the type generally applied to roofs prior to the application of roofing shingles, comprising*

*a length of roofing material having two surfaces; and*

*a row of nail tabs adhered during manufacture along the length of surface of said roofing material.*

*22. A roofing material in accordance with claim 21, wherein said row of nail tabs is a plurality of individual nail tabs at spaced intervals.*

*23. A roofing material in accordance with claim 21, wherein said row of nail tabs is a continuous strip.*

*24. A roofing material in accordance with claim 21, wherein said nail tabs are adhered to said roofing material with an adhesive.*

*25. A method of making a roofing material, comprising the steps of:*

*manufacturing a roofing material in extended lengths,*

*adhesively attaching a row of plastic nail tabs on the extended lengths of roofing material to produce a roofing material having nail tabs as an integral part thereof.*

*26. A method of making a roofing material in accordance with claim 25 wherein said row of plastic nail tabs is formed by adhesively attaching a plurality of individual nail tabs at spaced intervals.*

*27. A method of making a roofing material in accordance with claim 25 wherein said row of plastic nail tabs is formed by adhesively attaching a continuous strip.*

* * * * *